United States Patent [19]

Nakazawa

[11] 4,394,960
[45] Jul. 26, 1983

[54] HEATING APPARATUS FOR A PASSENGER COMPARTMENT OF A MOTOR VEHICLE

[75] Inventor: Sadaharu Nakazawa, Tokyo, Japan

[73] Assignee: Nissan Motor Co., Ltd., Yokohama, Japan

[21] Appl. No.: 279,301

[22] Filed: Jun. 30, 1981

[30] Foreign Application Priority Data

Jul. 1, 1980 [JP] Japan ............................ 55-91416[U]

[51] Int. Cl.³ ............................................. B60H 1/02
[52] U.S. Cl. ............................... 237/12.3 C; 237/8 C; 237/2 A
[58] Field of Search .................. 237/12.3 C, 12.3 B, 237/2 A, 8 C, 8 R; 123/545

[56] References Cited

U.S. PATENT DOCUMENTS

| 3,110,296 | 11/1963 | Lundi | 123/567 |
| 3,758,031 | 9/1973 | Moran | 237/12.3 C |
| 3,989,019 | 11/1976 | Brandt et al. | 123/552 |
| 4,294,219 | 10/1981 | Rowe | 123/557 |

FOREIGN PATENT DOCUMENTS 1154777 6/1969 United Kingdom ........... 237/12.3 B

Primary Examiner—William R. Cline
Assistant Examiner—John F. McNally
Attorney, Agent, or Firm—Lowe, King, Price & Becker

[57] ABSTRACT

A heating apparatus for a passenger compartment of a motor vehicle including a heater is provided with a bypass passage which bypasses an engine water jacket and an engine driven water pump, and a thermostat valve disposed between a feed passage from the engine water jacket and the heater so that the liquid from the engine water jacket is prevented from flowing into the heating circuit until the liquid temperature reaches to a predetermined level. A rapid warming up of the passenger compartment is enabled by forming a heating circuit with small water capacity through the bypass passage.

10 Claims, 3 Drawing Figures

HEATING APPARATUS FOR A PASSENGER COMPARTMENT OF A MOTOR VEHICLE

BACKGROUND OF THE INVENTION

1. Field of the Invention

The present invention relates to improvements in heating apparatus for a motor vehicle passenger compartment.

2. Description of the Prior Art

An apparatus for heating passenger compartments of motor vehicles is generally includes a heat exchanger disposed within the passenger compartment that is supplied with a high temperature liquid which has been used for cooling various portions of the engine.

With this type of apparatus, since liquid circulating through the heat exchanger is heated only when the engine is running subsequent to engine start-up, a considerably long period of time is required to raise the liquid temperature within the heat exchanger.

In order to solve the above problem, a heating apparatus is proposed wherein a heater, such as an external combustion heater, is provided to heat the liquid prior to engine start-up and to compensate for insufficient heat produced by the engine.

However, according to this type of conventional heating apparatus, it is necessary to warm up a considerably large amount of liquid held within an engine water jacket, the heat exchanger and a feed passage, by means of heat produced by the engine or the external combustion heater. A problem is still encountered in that liquid temperature does not rise rapidly, requiring considerable time to raise the temperature within the passenger compartment.

Furthermore, since the liquid is also utilized for the heater during engine idling, it is necessary to raise engine idling speed to shorten the liquid warm-up period. However, raising engine idling speed for improved heat generation results in increased fuel consumption.

SUMMARY OF THE INVENTION

According to the present invention, a heating apparatus comprises means for defining a liquid flow passage having an upstream end communicating with a relatively high pressure portion of an engine cooling system and a downstream end communicating with a relatively low pressure portion of the engine cooling system so as to allow a portion of the liquid within the cooling system to flow through the liquid flow passage. A control valve is provided for selectively preventing or allowing a liquid flow from the cooling system to the liquid flow passage. A bypass passage has one end communicating with the liquid flow passage at the downstream end thereof and an opposite end communicating with the liquid flow passage at the upstream end thereof. A pump is provided within the liquid flow passage to circulate liquid through the liquid flow passage and the bypass passage. A heater is provided to heat liquid flowing through the liquid passage. Under low temperature conditions, the control valve is closed to prevent liquid flow from the cooling system to the liquid flow passage so that only a resulting small amount of liquid circulates through the liquid passage and is subjected to rapid heating by the heater.

An object of the present invention is to provide a heating apparatus having a shortened time interval necessary to sufficiently raise temperatures within the passenger compartment to a high level.

DETAILED DESCRIPTION OF THE PREFERRED EMBODIMENTS

Figure 1:
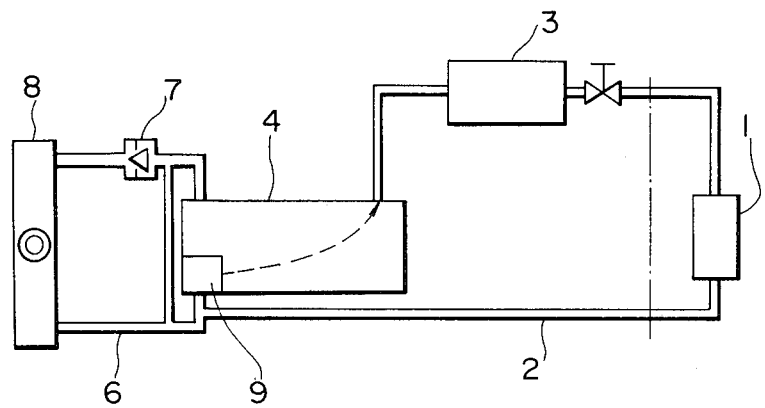
FIG. 1 is a schematic diagram of a conventional passenger compartment heating apparatus.

Referring to FIG. 1, a conventional heating apparatus includes a heat exchanger 1 disposed within a passenger compartment, a heater 3, and a return passage 2 connected to a water pump 9 driven by engine 4. Engine 4 is also provided with a cooling circuit which includes a radiator 8 and a thermostat 7 and a liquid return passage 6.

In this apparatus, an engine liquid having absorbed heat from engine 4, circulates to heat exchanger 1 for heating the passenger compartment. Heater 3 is further provided to compensate for insufficient heat levels initially produced by the engine, thereby improving the heating capacity of the apparatus, especially during winter seasons.

However, as aforementioned, this apparatus characteristically encounters the problems of slow warming-up and/or high energy consumption.

Figure 2:
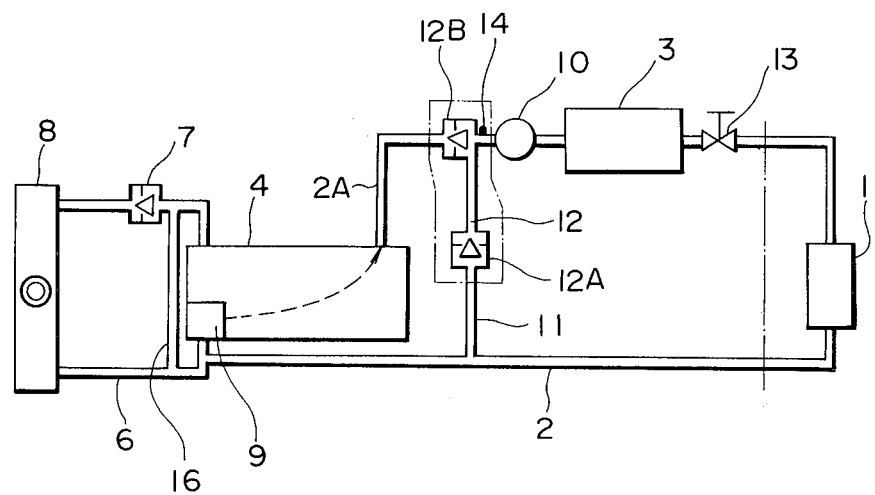
FIG. 2 is a schematic diagram of a first embodiment according to the present invention.

Referring now to FIG. 2 of the drawings, there is illustrated a preferred embodiment of a passenger compartment heating apparatus in accordance with the present invention.

In FIG. 2, an engine cooling circuit includes a radiator 8, a thermostat 7, a liquid return passage 6 and a radiator bypass passage 16. A heating circuit associated with the engine cooling circuit includes an engine water jacket, a first water pump 9 driven by engine 4, a return passage 2, a heat exchanger 1 disposed within a passenger compartment, a heater 3 which may take the form of an external combustion heater, a second water pump 10, a feed passage 2A, a first thermostat valve 12B, bypass passage 11 connected between a rear chamber of the first thermostat valve 12B and the return passage 2, and a second thermostat valve 12A disposed within the bypass passage 11.

The thermostat 7 is designed to open when the liquid temperature is above a predetermined level. Radiator bypass passage 16 is connected between the upstream end of thermostat 7 and the liquid return passage 6 for allowing water to circulate under a pressure from first water pump 9 driven by the engine 4 when the thermostat 7 is closed.

This engine cooling circuit operates in the same manner as the ordinary engine cooling systems and the operation is as follows; when the liquid temperature is below the predetermined level, the thermostat 7 is closed and heat dissipation through radiator 8 is prevented unti the engine is sufficiently warmed up. After engine warm up, when the predetermined liquid temperature level is reached, thermostat 7 is opened to circulate liquid through the engine cooling circuit and the heat of the engine absorbed by the liquid is dissipated to the air through the radiator core.

Turning again to the explanation of component elements of the heating apparatus, the second water pump 10 being preferably in the form of an electric pump, is driven independently of engine operation.

With the operation of second water pump 10, liquid is directed to heat exchanger 1 through heater 3. Thus, liquid circulation through the heating circuit also occurs when the engine is stopped.

The heater 3 disposed upstream of the heat exchanger 1 is provided for heating the liquid within the heating circuit independently of the engine operation, thus the heating apparatus is provided with two independent heat sources, respectively, the heater 3 and the internal combustion engine 4.

The first and second thermostat valves 12B and 12A, forming a temperature responsive valve system 12, are preferably in the form of thermostat values which is subjected to the thermal expansion of an expansible element incorporated therein and responsive to the temperature of the liquid.

The first thermostat valve 12B is set so as to open when the liquid temperature is above a first predetermined level and the second thermostat valve 12A is set so as to close when the temperature of the liquid is above a second predetermined level higher than said first predetermined level.

These two thermostat valves 12B and 12A are designed so that the opening and closing operation takes place gradually in order to prevent the cold liquid within the engine water jacket from rushing into the heating circuit, especially to heat exchanger 1. Otherwise, the efficiency of the heating apparatus is temporarily impaired due to cold liquid.

In addition, a valve 13 is further provided upstream of the heat exchanger 1 for shutting off a feed passage of the heat exchanger 1 during the season in which the heating apparatus is not used.

The operation of the above heating apparatus is now explained. When the atmospheric temperature is low for example, during the winter season, the valve 13 is automatically or manually opened in response to the liquid temperature the heating circuit to operate.

The thermostat valve system 12 is calibrated, in this case, such that the first thermostat valve 12B is opened above an appropriate level within a range from 60° to 70° C. and the second thermostat valve 12A is fully opened below an appropriate level within a range from 60° to 95° C.

Therefore, when the liquid temperature is low, the feed passage 2A is closed by the thermostat valve 12B and the liquid within the heating circuit flows through the bypass passage 11. The second water pump 10 and the heater 3 are actuated prior to engine start-up in order to effect the heating operation of the apparatus.

The high temperature liquid heated by the heater 3 is urged to flow into the heat exchanger 1 by means of the second water pump 10. At the heat exchanger 1, the high temperature liquid loses its heat to the air within the passenger compartment. After passing through the heat exchanger, the liquid flows through a portion of the return passage 2, through the bypass passage 11 to the second water pump 10. Thus, in this state, a heating circuit with a small water capacity is formed. With this heating circuit, the rapid rise in the liquid temperature enables a very rapid warming up of the passenger compartment temperature.

Thereafter, when the temperature of the cooling water rises up to the predetermined level, the first thermostat valve 12B begins to open. At the same time of the opening of the first thermostat valve 12B, or a little later, the thermostat valve 12A begins to close. By the operation of the thermostat valve system 12, the liquid begins to flow into the heater 3 through the water jacket of the engine 4 instead of the bypass passage 11. Thus, an engine warming operation starts.

If the opening and closing operation of the first thermostat valve 12B takes place rapidly, a low temperature liquid within the engine water jacket rushes into the heater 3 and the heat exchanger 1 quickly, which causes a sudden drop of the heater temperature. Therefore, the thermostat valves are designed so that the opening and closing operation thereof is effected gradually in order to appropriately control the amount of the liquid flowing therethrough.

The starting of engine 4 becomes easier when the temperature of the liquid within the engine water jacket rises up to an appropriate level, because the cylinder wall of engine 4 and the lublication oil is heated by the liquid which is heated by heater 3.

After starting engine 4, the flow of the liquid is divided into two circuit systems, viz., the heating circuit through the first thermostat valve 12B, and the engine cooling circuit due to the operation of the first water pump driven by the engine 4. Until the liquid temperature reaches the predetermined level, the liquid within the engine cooling circuit flows through the radiator bypass passage 16 in accordance with the operation of the thermostat 7.

Operation of heater 3 ceases when liquid within engine 4 rises above a predetermined level, since the heating of the passenger compartment is sufficiently effected by means of the heat radiated by the engine 4.

In addition, when the cooling water temperature within the engine rises above the predetermined level, the thermostat 7 opens to permit flow of cooling water through radiator 8, and, in this manner, liquid temperature is maintained within a desired level.

Furthermore, although the thermovalve system 12 is made up of a pair of the thermostat valve 12A and 12B in this embodiment, the arrangement is not limited to the above, and such an arrangement is usable that the liquid temperature is detected by a water temperature sensor 14 disposed within the heating circuit, and an electric valve operated in response to the water temperature sensor 14 is provided in place of the thermostat valve system 12.

In addition, it is needless to say that the timing of the engine starting is not limited to the above timing, and the engine may be started at a desired timing.

Figure 3:
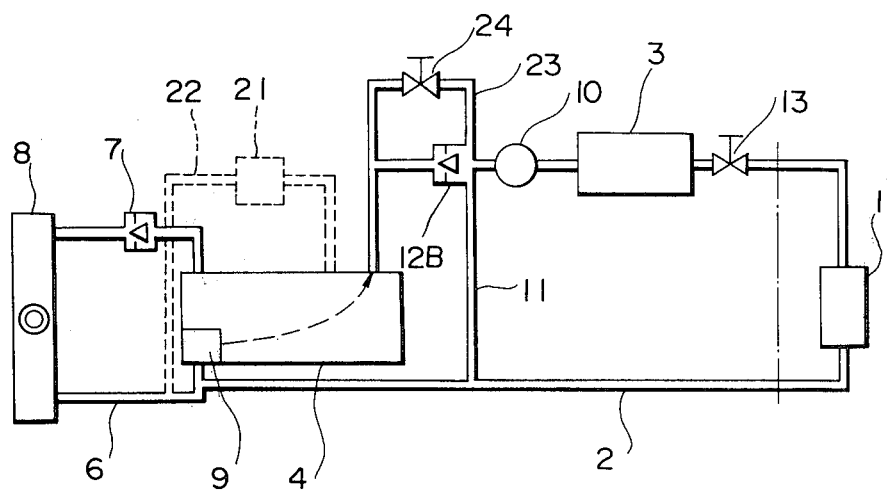
FIG. 3 is a schematic diagram of a second embodiment according to the present invention.

FIG. 3 shows a second embodiment according to the present invention, wherein a radiator bypass passage 16 has been eliminated and the function thereof is replaced by the other fluid passage for allowing the flow of liquid bypassing the radiator 8. As is previously mentioned, in the case of engine cold start, the thermostat 7 is kept closed until the liquid temperature rises sufficiently high for preventing the liquid from circulating through the radiator 8 in order to shorten the warming up period. Since the bypass passage is not provided in this embodiment, an open fluid passage for allowing the pressurized fluid discharged by the water pump 9 flowing therethrough is preferably provided within the heating circuit. However, the first thermostat valve 12B at the downstream of the feed passage 2A is closed so as to prevent the fluid flowing into the heating circuit in the case of the cold engine start.

Therefore, a bypass passage 23 is provided for bypassing the first thermostat valve 12B and the second thermostat valve 12A is eliminated. Furthermore, a valve 24 is provided to open or close this bypass passage 23. This valve 24 may preferably be a valve controllable by a manual operation and opened prior to the engine cold start. In addition, the valve 24 may take the form of a thermostat valve which opens below a predetermined low engine temperature.

With this arrangement, the pressurized fluid discharged by the water pump 9 flows through the bypass passage 23, and through the bypass passage 11, and returns to the water pump 9 through the return passage 2. After the engine is sufficiently warmed up, the thermostat 7 opens to allow the fluid passing through the radiator 8 and the valve 24 disposed in the bypass passage 23 is closed automatically or by a manual operation.

Moreover, the operation of the bypass passage may be replaced by forming an aperture within the first thermostat valve 12B for securing a minimum flow passing therethrough.

In addition, if the engine is provided with a carburetor heating circuit 22 for the warming up of a carburetor 21 indicated by broken lines in FIG 3, the bypass passage 23 is not necessary because the fluid discharged by the pump 9 is allowed to flow through the carburetor heating circuit 22.

What is claimed is:

1. A heating apparatus for a passenger compartment of a motor vehicle, said vehicle having an engine and a liquid cooling circuit system for the engine, said cooling system including a radiator and a pump forming a high pressure portion and a low pressure portion during operation of said pump within the liquid cooling system, the heating apparatus comprising:

means defining a vehicle cabin heating circuit including a liquid flow passage having an upstream end communicating with the high pressure portion of the liquid cooling system and a downstream end communicating with the low pressure portion of the cooling system so as to allow a portion of the liquid within the cooling system to flow through said liquid flow passage;

a heat exchanger fluidly disposed within said liquid flow passage;

control means resspponsive to cooling fluid temperature for selectively causing cooling fluid to flow through the liquid flow passage and through the heat exchanger means in a first circulating mode wherein cooling fluid in the liquid flow passage is substantially isolated from the cooling circuit to prevent flow through the engine and the engine cooling system to enable the heater means to rapidly heat the portion of cooling fluid in the liquid flow passage without heating fluid in the cooling system for rapid passenger compartment warm-up, and a second circulating mode wherein cooling fluid from the engine and cooling circuit flows into said liquid flow passage of the heating circuit, said control valve means including a normally closed first valve preventing liquid flow from the cooling circuit into the heating circuit liquid passage in the first circulating mode and being operable to gradually open when liquid temperature in the heating circuit is above a first predetermined level, thereby initiating the second circulating mode wherein fluid in the cooling circuit gradually flows into the heating circuit to prevent a sudden temperature drop in said heating circuit;

means for defining a bypass passage in the heating circuit having one end communicating with the liquid flow passage at the downstream end thereof and an opposite end communicating with said liquid flow passage at the upstream end thereof, said bypass passage being positioned to allow cooling liquid to circulate through the liquid flow passage and bypassing the engine cooling system;

pump means within said liquid flow passage for effecting circulation of liquid through said liquid flow passage and said bypass passage; and heater means for heating the cooling liquid flowing through said liquid passage.

2. A heating apparatus as claimed in claim 1, wherein said normally closed first valve is a thermostat valve closed to prevent liquid flow from the cooling system to said liquid flow passage and operable to gradually open when the temperature of the liquid downstream of said thermostat valve rises to a first predetermined level.

3. A heating apparatus as claimed in claim 2, further including a second bypass passage positioned in the cooling circuit for allowing liquid discharged by the pump of the cooling system to pass therethrough, thereby bypassing the radiator when part of said control valve means in the cooling circuit is closed.

4. A heating apparatus according to claim 3 wherein said control valve means includes a second normally open valve provided in said heating circuit bypass passage, said second valve being capable of being closed to prevent liquid flow through said heating circuit bypass passage to prevent circulation only through said heating circuit, said second valve being open when liquid temperature in said heating circuit is below a second predetermined temperature level greater than the first level and being closed gradually when liquid temperature in said heating circuit reaches said second predetermined temperature.

5. A heating apparatus as claimed in claim 4, a thermostat valve arranged to cloas liquid flow toward the radiator so as to allow same to bypass through said cooling circuit bypass passage when the first valve begins to open.

6. A heating apparatus according to claim 4 wherein said first predetermined temperature is within a range of 60° C. to 70° C. and said second predetermined temperature is within a range of 60° to 95° C.

7. A heating apparatus according to claim 3 wherein said cooling circuit bypass means includes means for conveying liquid from the upstream side of said first valve to the downstream side of the first valve for allowing liquid discharged by said cooling circuit pump to flow into said heating circuit bypass passage and back to said cooling circuit pump when said first valve is closed.

8. The temperature control system according to claim 7 wherein said conveying means in the cooling circuit bypass means is an orifice formed in said first valve.

9. A heating apparatus as claimed in claim 1, wherein said cooling circuit bypass means comprises a carburetor heating circuit having one end connected to the high pressure portion of the cooling system and an opposite end connected to the low pressure portion of the cooling system.

10. A heating apparatus as claimed in claim 1, including means for operating said pump means and heater means when the engine is not in operation.

* * * * *